Sept. 7, 1965 P. A. AKIN 3,205,366
SHUTTER-OPERATED PHOTOELECTRIC SWITCH
Filed July 25, 1962 2 Sheets-Sheet 1

PHILLIP A. AKIN
INVENTOR.

BY Gene W. Arant
C. Lauren Maltby
ATTORNEYS

Sept. 7, 1965 P. A. AKIN 3,205,366

SHUTTER-OPERATED PHOTOELECTRIC SWITCH

Filed July 25, 1962 2 Sheets-Sheet 2

PHILLIP A. AKIN
INVENTOR.

BY Gene W. Arant
C. Lauren Maloby
ATTORNEYS

United States Patent Office 3,205,366
Patented Sept. 7, 1965

3,205,366
SHUTTER-OPERATED PHOTOELECTRIC SWITCH
Phillip A. Akin, 1522 Strand, Hermosa Beach, Calif.
Filed July 25, 1962, Ser. No. 212,398
5 Claims. (Cl. 250—229)

This invention relates to electrical apparatus and more especially to photoelectrically operated switches.

Mechanically actuated electrical switches are subject to an inherent imperfection in what is known as contact bounce, i.e., failure to achieve a sharp opening and closing action. This bouncing action is not observable to the naked eye and may extend over a time interval of several mircroseconds, which, in an electrical circuit is a relatively long time. Such a time interval is excessive, particularly in circuits in computing machines wherein the contacts may be operated several times within a single microsecond. In view of the fact that accuracy is essential in computing and similar types of electrical apparatus the significance of contact bounce is readily apparent. Photoelectrically operated apparatus is already well known, however, its adaption to the elimination of contact bounce in mechanically operated electrical switches is considered to be novel.

The present invention has therefore been developed to utilize the relatively smooth movement of the camera shutter between open and closed positions to control the actuation of a photocell to activate an electrical circuit for the opening or closing of an electrical switch wherein any bounce of the camera shutter does not affect the action of the electrical switch.

It is therefore the primary purpose and objective of this invention to provide a novel shutter-operated photoelectric switch.

Another object of the invention is to provide improvements in electrical switch actuation by a photoelectric cell which in turn is actuated from a light source controlled by a fast operating shutter of the camera type.

A further object of the invention is to provide a novel bounce-free, photoelectrically operated switch wherein the electrical switch action is completed during the open portion of the shutter action which controls the photoelectric device.

More particular objects and advantages of the invention will become apparent and be brought out more fully in the following specification, reference being had to the accompanying drawing herein:

Figure 2:
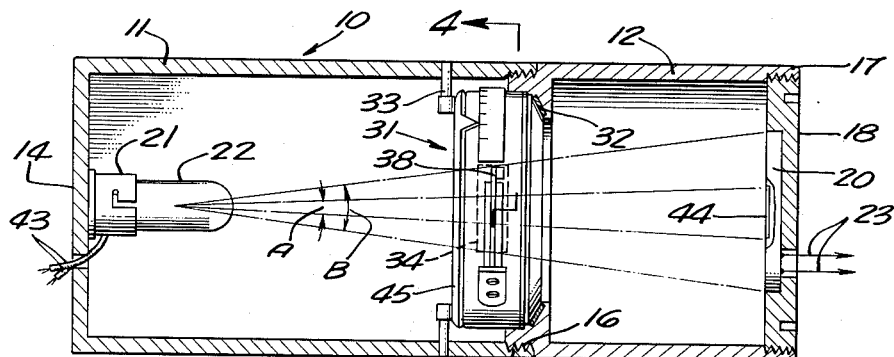
FIGURE 2 is a sectional view, enlarged, taken along line 2—2 of FIGURE 1.
Figure 1:
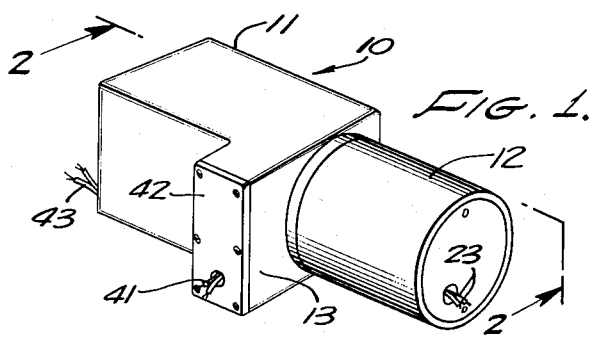
FIGURE 1 is a perspective view of a shutter-operated photoelectric switch embodying the present invention.
Figure 4:
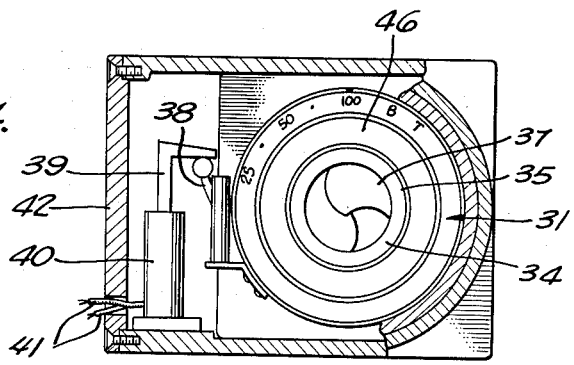
FIGURE 4 is a sectional view taken along line 4—4 of FIGURE 2.

Referring now to FIGURES 1 and 2 of the drawing, the switch of this invention is incorporated in a housing or casing 10 having a lamp compartment 11 and a photocell compartment 12. Lamp compartment 11 has end walls 13 and 14, the latter having a threaded opening 15 in which is received a threaded end portion 16 of the threaded end of photocell compartment 12 which is shown as being cylindrical in shape. Compartment 12 has a threaded outer end 17 in which is threadedly received an end plate 18. A photocell disc 20 is secured to, or recessed in, the inner face of end plate 18. A lamp socket 21 is secured on the inner side of end wall 14 and mounts a lamp 22.

Conductor wires 23 lead from photocell 20 for connection to a utilization circuit such as a logical circuit of a computer or similar machine.

A shutter unit 31 is mounted between lamp compartment 11 and photocell compartment 12 by a beveled seat formation 32 in photocell compartment 12 and two or more pins 33 which extend inwardly from top and bottom or sidewalls of the lamp compartment 11. The shutter unit suitably supports a lens 34 and a lens aperture frame 35 which has an aperture opening diameter 36.

The shutter unit includes a plurality of overlapping shutter leaves 37 connected to and moved by an actuating lever 38 from open to closed position. Shutter lever 38 may be actuated in any suitable and preferred manner but is shown as being operatively connected to a plunger 39 of an electrical solenoid 40 to which control and actuating wires 41 are connected which extend through a cover plate 42 forming a sidewall portion of the lamp housing compartment 11. Conductor wires 43 are run from lamp base 21 through sidewall 14 of the lamp compartment 11. Photocell 20 has a central opaque spot 44 not sensitive to the light rays emanating from lamp 22. The shutter unit has the usual adjustable aperture opening ring mechanism 45, and a timing control assembly for the shutter action is indicated at 46.

Figure 3:
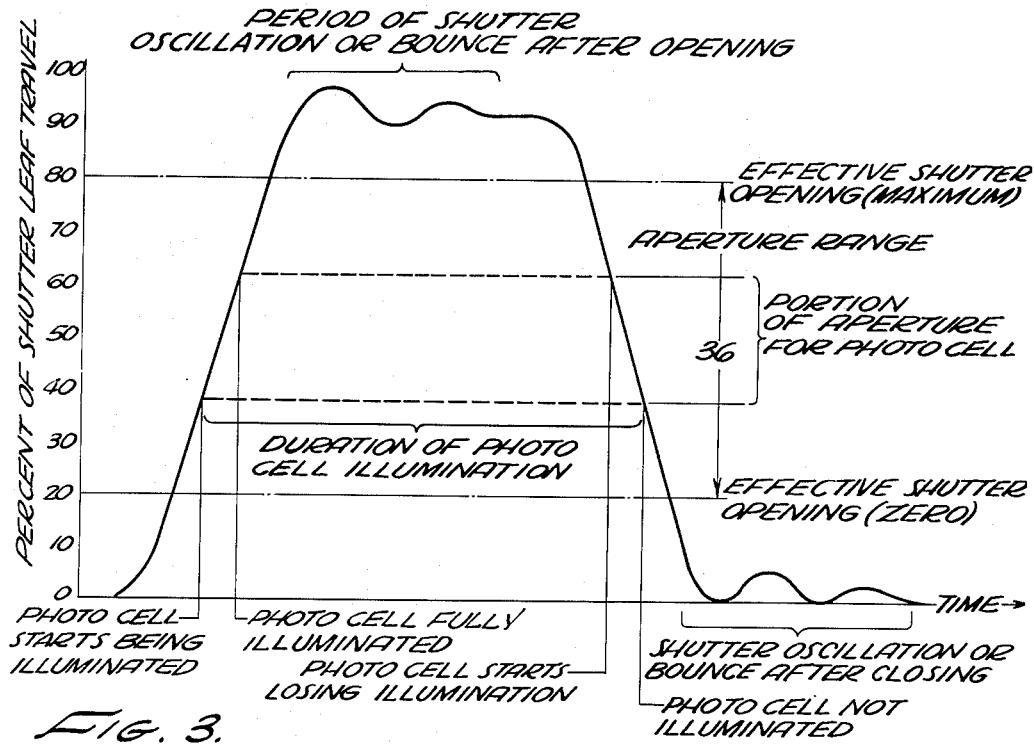
FIGURE 3 is a chart showing the time intervals during which the several parts of the apparatus of FIGURES 1 and 2 are actuated.
Figure 5:
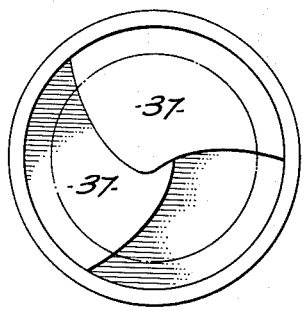
FIGURE 5 is a partial view of the lens-mounting and shutter system showing the shutters in closed position.
Figure 6:
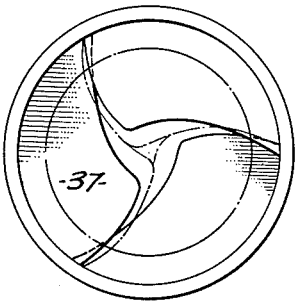
FIGURE 6 is a view similar to FIGURE 5 showing the shutters in the partially open position.
Figure 8:
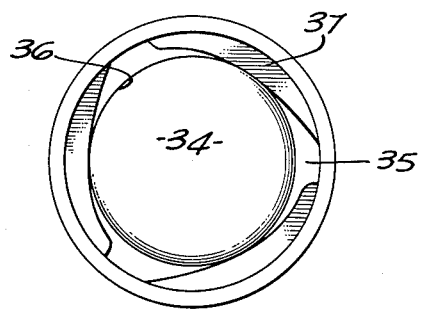
FIGURE 8 is a view similar to FIGURE 7 showing the shutters in a still further partially open position.
Figure 7:
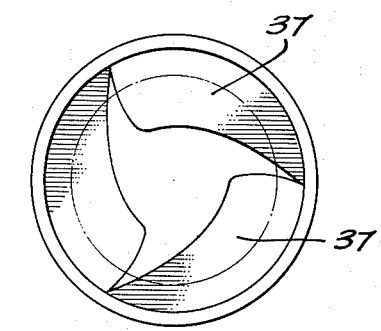
FIGURE 7 is a view similar to FIGURE 6 showing the shutters in a further partially open position.

FIGURES 5 to 8 show the action of the shutter and specifically the relative position of the shutter leaves 37 at different intervals between closed and open positions and this movement is also illustrated in the chart of FIGURE 3. FIGURE 5 shows the shutter in closed position; FIGURE 6 (the broken line position), the shutter opening after about 20% of the shutter movement, while the full line showing illustrates the shutter position at approximately 40% of the shutter movement; FIGURE 7 shows the eshutter position at approximately 60% of the shutter movement; and FIGURE 8 shows the shutter leaf position at 80% of travel for maximum transmission of light through the lens 34.

In the operation of the invention plunger 39 of the solenoid 40 is actuated when the solenoid is energized from a control impulse received through circuit wires 41 thereby actuating shutter lever 38 to open or close the shutter leaves 37 whereby light from lamp 22 strikes or is interrupted from striking the photocell 20. The variation in voltage of the photocell is thereby applied to the utilization circuit through wires 23 for actuation of said circuit.

FIGURE 3 shows the time sequence and intervals of actuation of the shutter and the photocell and illustrates the period of shutter oscillation or bounce after opening and after closing. This figure also shows clearly that the photocell is actuated during the limited period of time between approximately 40% and 60% of the shutter travel. This limited period of time of actuation is made possible by the central opaque area 44 of the photocell which area is not sensitive to photoelectric action, and it becomes apparent that the photocell actuation is complete at or before 50% of the shutter travel. The cones of light indicated in FIGURE 2 further illustrate this action. Cone A represents 40% and cone B 60% of shutter travel. Thus it will be clear that the switch action of this invention is accomplished without any bounce of the switch contacts and that it is not affected by any bounce of the shutter leaves at the end of either the opening or closing movement of the shutter.

The shutter unit 31 is disclosed as including a lens 34, however a lens is not essential to the switch and may be omitted. The cones of light A and B are indicative of a shutter unit not having a lens. If a lens is used these cones would converge on the photocell 20 rather than diverge as shown.

While the switch of this invention is shown as being actuated by a solenoid operated shutter, this is by way of illustration only. The shutter can, and in many instances will, be manually operated for photoelectric bounce-free actuation of this switch. The pulse durations will, of course, be those determined by the shutter timing settings.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

What is claimed is:

1. A shutter-operated photoelectric switch comprising, in combination:
   a photoelectric sensor device;
   a light source for illuminating said sensor device;
   housing means in which said sensor device is disposed;
   and a shutter cooperating with said housing means for controlling the illumination supplied to said sensor device from said light source;
   said shutter being actuable for moving between completely open and completely closed positions;
   and means for controlling the relationship between said light source, said sensor device, and said shutter such that said sensor device experiences a change between its minimum and maximum levels of illumination in response to only a partial opening or closing of said shutter.

2. A device as claimed in claim 1 wherein said shutter, in its opening or closing action, is characterized by one area of movement which is linear with respect to time and by another area of movement which is non-linear with respect to time; said change between minimum and maximum illumination levels of said sensor device being accomplished solely by said linear movement of said shutter.

3. A device as claimed in claim 1 wherein said shutter is of the leaf type.

4. A device as claimed in claim 1 wherein said sensor device has a non-sentitive area toward which light is initially directed during an opening movement of said shutter which comprises the last-mentioned means.

5. A shutter-operated photoelectric switch comprising, in combination:
   a photoelectric sensor device;
   a continuously energized light source for illuminating said sensor device;
   a housing in which said light source and said sensor device are disposed;
   and a leaf shutter cooperating with said housing for controlling the illumination supplied to said sensor device from said light source;
   said shutter being actuable for moving between completely open and completely closed positions, and being characterized, in either its opening action or its closing action, by one area of movement which is linear with respect to time and by another area of movement which is non-linear with respect to time;
   said sensor device having a central, non-sensitive area toward which light is initially directed during an opening movement of said shutter;
   the relationship between said light source, said sensor device, and said shutter being such that said sensor device experiences a change between its minimum and maximum levels of illumination in response to a partial opening or closing of said shutter occurring in said linear movement area thereof.

References Cited by the Examiner

UNITED STATES PATENTS

| | | | |
|---|---|---|---|
| 1,954,329 | 4/34 | Schoenberg | 250—237 X |
| 2,081,839 | 5/37 | Rankin | 250—237 X |
| 2,199,394 | 5/40 | Dewan | 250—237 X |
| 3,035,489 | 5/62 | Simons | 250—237 X |

RALPH G. NILSON, *Primary Examiner.*